United States Patent
Chen

(10) Patent No.: US 6,871,380 B2
(45) Date of Patent: Mar. 29, 2005

(54) WHEEL DEVICE FOR STROLLER

(75) Inventor: Shun-Min Chen, Taipei Hsien (TW)

(73) Assignee: Kenny Cheng (TW)

( * ) Notice: Subject to any disclaimer, the term of this patent is extended or adjusted under 35 U.S.C. 154(b) by 0 days.

(21) Appl. No.: 10/437,675

(22) Filed: May 14, 2003

(65) Prior Publication Data

US 2004/0226134 A1 Nov. 18, 2004

(51) Int. Cl.$^7$ ............................................. B60B 33/06
(52) U.S. Cl. ........................... 16/35 R; 16/19; 16/42 R
(58) Field of Search ........................ 16/19, 35 R, 42 R; 403/85, 103, 104, 109.5

(56) References Cited

U.S. PATENT DOCUMENTS

| | | | | |
|---|---|---|---|---|
| 1,896,234 A | * | 2/1933 | Hathorn | 244/109 |
| 2,068,160 A | * | 1/1937 | Zeindler | 16/35 R |
| 2,188,648 A | * | 1/1940 | Bouvier et al. | 16/35 R |
| 3,439,672 A | * | 4/1969 | Fisher | 602/16 |
| 4,028,773 A | * | 6/1977 | Morgan | 16/35 R |
| 4,336,629 A | * | 6/1982 | Jarvis et al. | 16/35 R |
| 4,349,938 A | * | 9/1982 | Fontana | 16/35 R |
| 4,649,596 A | * | 3/1987 | Kassai | 16/35 R |
| 4,913,452 A | * | 4/1990 | Zun | 280/47.41 |
| 6,671,926 B2 | * | 1/2004 | Huang | 16/35 R |

FOREIGN PATENT DOCUMENTS

| | | |
|---|---|---|
| GB | 0800965 | 9/1958 |
| GB | 0851157 | 10/1960 |
| GB | 2272368 | 5/1994 |
| GB | 2361179 | 10/2001 |
| WO | WO 94/10000 | 5/1994 |

* cited by examiner

*Primary Examiner*—Gary Estremsky
*Assistant Examiner*—Mark Williams
(74) *Attorney, Agent, or Firm*—Gauthier & Connors LLP

(57) ABSTRACT

A wheel device for a stroller comprises a supporting seat, a swivel wheel frame assembly penetrating the supporting seat, and a sliding member provided on the upper surface of the supporting seat. By sliding on the upper surface of the supporting seat, the sliding member can be served to adjust the position of the pin so as to switch the swivel wheel frame assembly between the states of fixation and rotation and is of the functions of fixing the wheel in a predetermined direction and quick release.

4 Claims, 5 Drawing Sheets

US 6,871,380 B2

WHEEL DEVICE FOR STROLLER

FIELD OF THE INVENTION

The present invention relates generally to a wheel device for a stroller, and more particularly to a wheel device whose sliding member can quickly fix the wheel in a predetermined direction and release therefrom.

BACKGROUND OF THE INVENTION

The conventional stroller generally includes two wheel devices respectively installed at the front and the rear parts of the stroller, a main frame, a collapsing mechanism, and a handlebar for controlling the stroller to go forward. Most of strollers respectively have a wheel at right side and left side in the front and rear wheel devices to make the stroller respectively has a wheel at four corners of the bottom of the stroller. Besides this kind of the four-wheeled stroller, there is a three-wheeled stroller which is characterized in that the front wheel device only has a wheel and the rear wheel device respectively has a wheel at the right and left sides. The significant advantage of the three-wheeled stroller is the single front wheel is easier and more smooth in the respect of changing direction than that of the four-wheeled stroller and adapted to move faster. For example, the user goes jogging or rapidly walking with the stroller for taking exercise.

Because one major object of the three-wheeled stroller is to easily and smoothly change directions and rapidly move, the wheel having a large diameter is more competent to the requirements. The wheel with the large diameter has better effects on changing directions and absorbing the jolt due to the rough road. However, the large wheel increases the volume of the stroller, especially in the state of collapsing, which is disadvantageous for accommodation and transportation. Therefore, in certain situations, the user desires the wheel to be easily and quickly released, particularly for the large front wheel device.

What is more important is although the three-wheeled stroller has the feature of easily changing directions, in certain situations, the user however must fixed the front wheel device at a predetermined direction to prevent it from unnecessarily changing the march direction. Therefore, it is necessary for front wheel device to have a direction-fixed means reliable and easy to be operated.

SUMMARY OF THE INVENTION

Accordingly, the present invention relates to a wheel device for a stroller that can substantially obviate one or more of the problems due to the limitations and disadvantages of the related arts.

One object of the present invention is the provision of a wheel device for a stroller which can be quickly released by the user.

Another object of the present invention is the provision of a wheel device for a stroller which can be fixed at the forward and backward directions by the user through simple and easy operation.

A further object of the present invention is the provision of a wheel device for a stroller which can obtain the reliable function to fix the wheel device at forward and backward directions.

Additional features and advantages of the invention will be set forth in the description which follows, and in part will be apparent from the description, or may be learned by practice of the invention. The objectives and advantages of the invention will be realized and attained by the structure particularly pointed out in the written description and claims hereof as well as the appended drawings.

To achieve these and other advantages and according to the purpose of the present invention, as embodied and broadly described, a wheel device for a stroller comprises a supporting seat, a swivel wheel frame assembly, a pin and a sliding member. The supporting seat has a frame-receiving bore and a pin-receiving hole. The swivel wheel frame assembly has a plate with at least two openings and is connected with the supporting seat by penetrating the frame-receiving bore. The pin is inserted in the pin-receiving hole and has a cover and a restoration element providing the pin with a restoration force. The sliding member is movably installed on an upper surface of the supporting seat and has a wedge member interposed between the cover and the supporting seat. When the sliding member is situated at two different positions, the pin is correspondently in states of engagement or disengagement with the plate.

It is preferred that the restoration element is a spring.

Alternatively, the openings include a front opening and a rear opening.

Advantageously, the swivel wheel frame assembly is provided with a stud at an upper end for securing the swivel wheel frame assembly to supporting seat.

It is to be understood that both the forgoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principle of the invention. In the drawings.

DETAILED DESCRIPTION OF THE INVENTION

Figure 1:
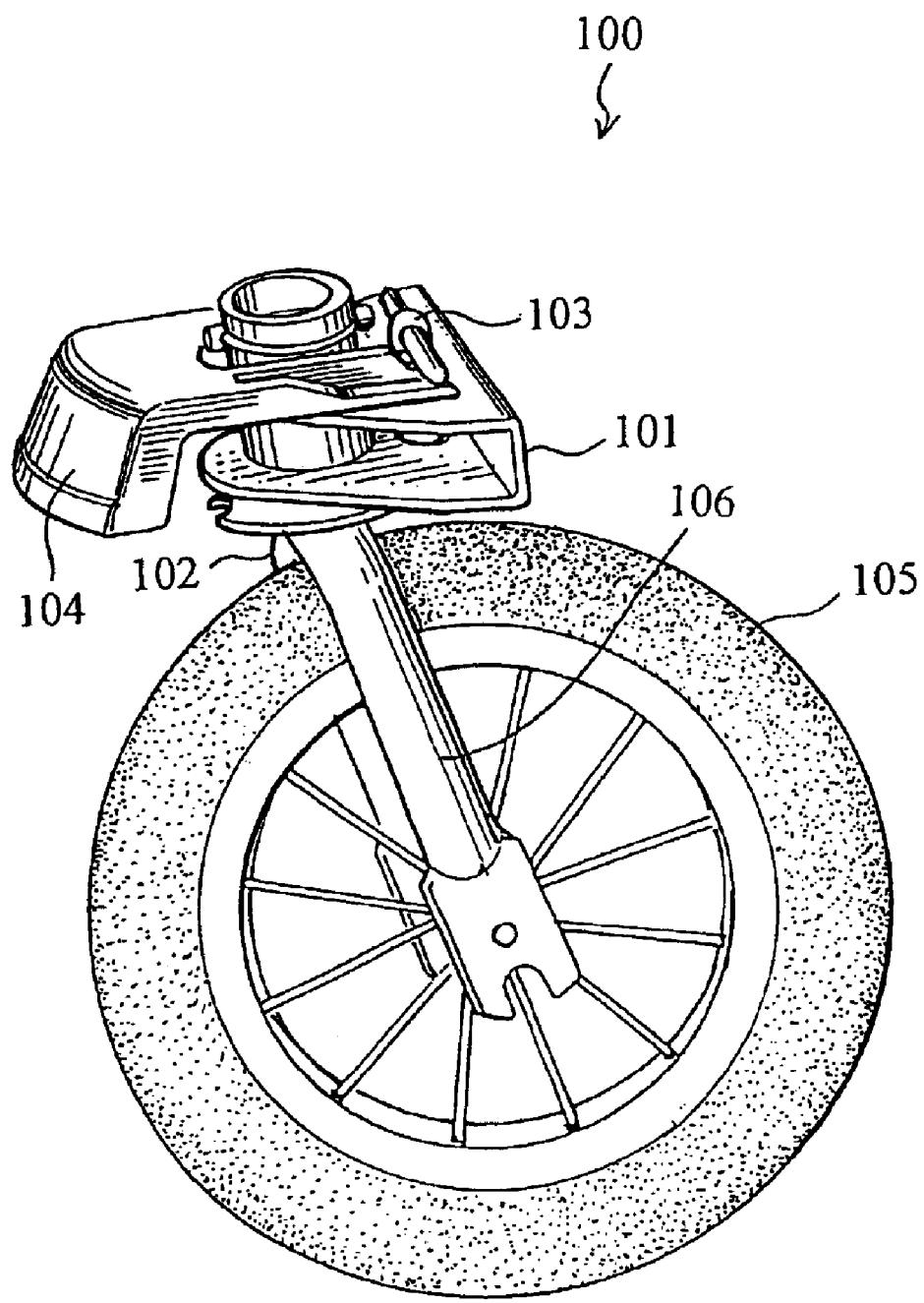
FIG. 1 is a perspective view illustrating a preferred embodiment of the wheel device for the stroller according the present invention.

FIG. 1 is a perspective view illustrating a preferred embodiment of the wheel device for the stroller according the present invention. As shown in FIG. 1, a wheel device 100 for a stroller comprises a supporting seat 101, a swivel wheel frame assembly 102 penetrating the supporting seat 101, a pin 103 inserted in the supporting seat 101, a sliding member 104 movably installed on an upper surface of the supporting seat 101, and a wheel 105 connected to one end of a brace 106 of the swivel wheel frame assembly 102. The detail structures and connecting relations of the above mechanisms will be further illustrated hereinafter referring to other drawings.

Figure 2:
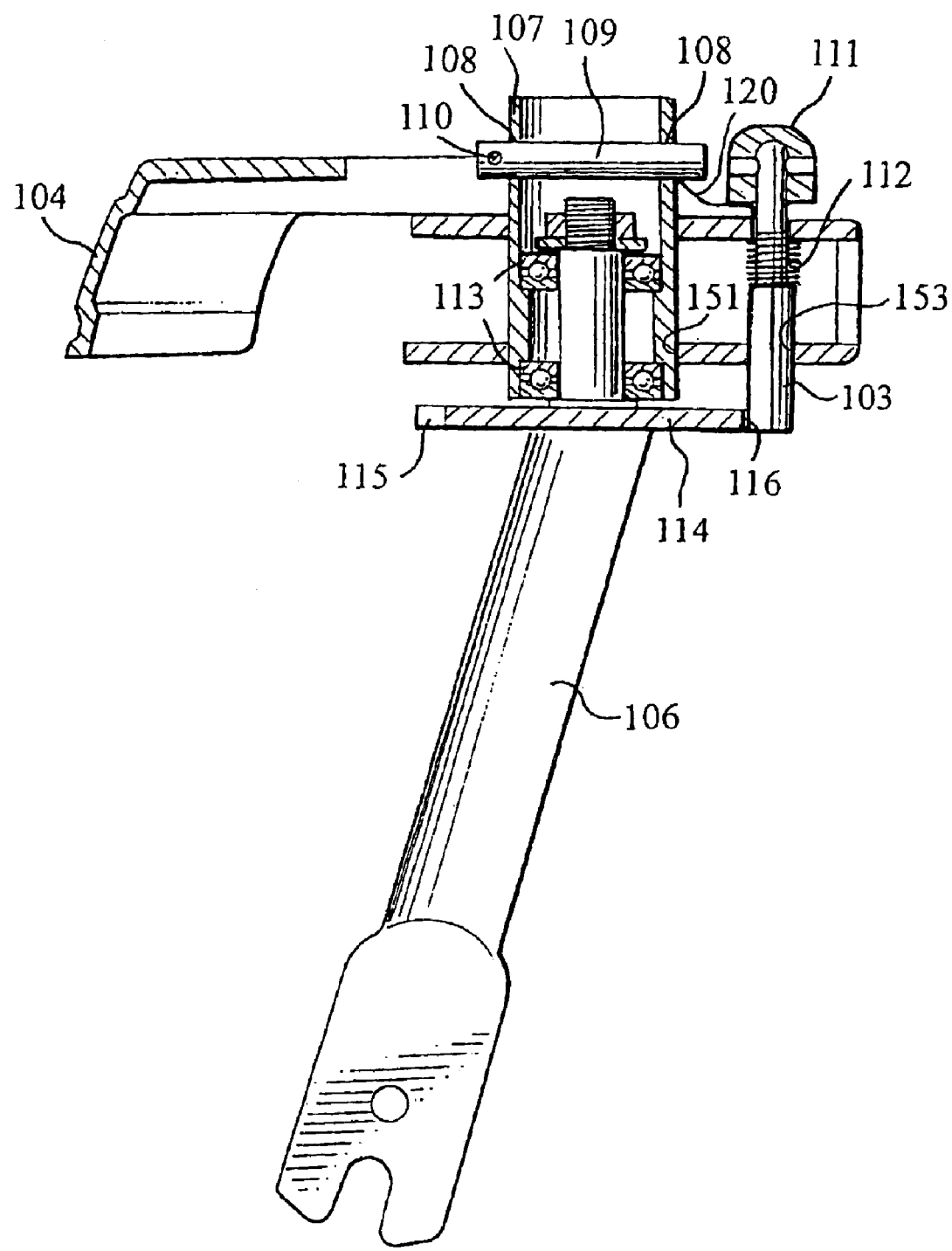
FIG. 2 is a sectional view of the wheel device for the stroller according the present invention.

FIG. 2 is a sectional view of the wheel device for the stroller according the present invention. As shown in FIG. 2, the swivel wheel frame assembly 102 is connected to the supporting seat 101 by penetrating it through a pair of frame-receiving bores 151. The swivel wheel frame assembly 102, at an upper portion, includes a sleeve 107 having a pair of apertures 108 for receiving a stud 109 which extends beyond the circumference of the sleeve 107 at both ends in order to secure the swivel wheel frame assembly 102 to the supporting seat 101. A ring 110 is engaged with the stud 109 so as to restrict the stud 109 in the apertures 108. The pin 103, at an upper end, has a cover 111 whose diameter is larger than that of the body of the pin 103. A restoration element 112, such as a spring, is bushed around the pin 103 at middle part for providing the pin 103 with a downward restoration force. Because the diameter of the cover 111 is larger than that of pin 103 and that of the pin-receiving hole 153, the pin 103 is still restricted by the cover 111 and cannot escape from the supporting seat 101 even if the pin 103 is downwardly exerted a force by the restoration element 112.

The sleeve 107 further accommodates at least a ball bearing 113 in its interior and is connected with a brace 106 at its lower end. The balls of the ball bearing 113 roll around the inner wall of the sleeve 107 so as to permit the brace 106 smoothly rotating relative to the sleeve 107. The sleeve 107 is restricted by the stud 109 in order to be secured to the supporting seat 101 and further allow the brace 106 and the wheel 105 connected to the brace 106 to smoothly and quickly rotate relative to supporting seat 101.

A plate 114, installed beneath the ball bearing 113, has a front opening 115 and a rear opening 116. The brace 106 is directed to go forward when the front opening 115 is aligned with the pin 103. The brace 106 is directed to retreat when the rear opening 116 is aligned with the pin 103 (as shown in FIG. 2).

Figure 3:
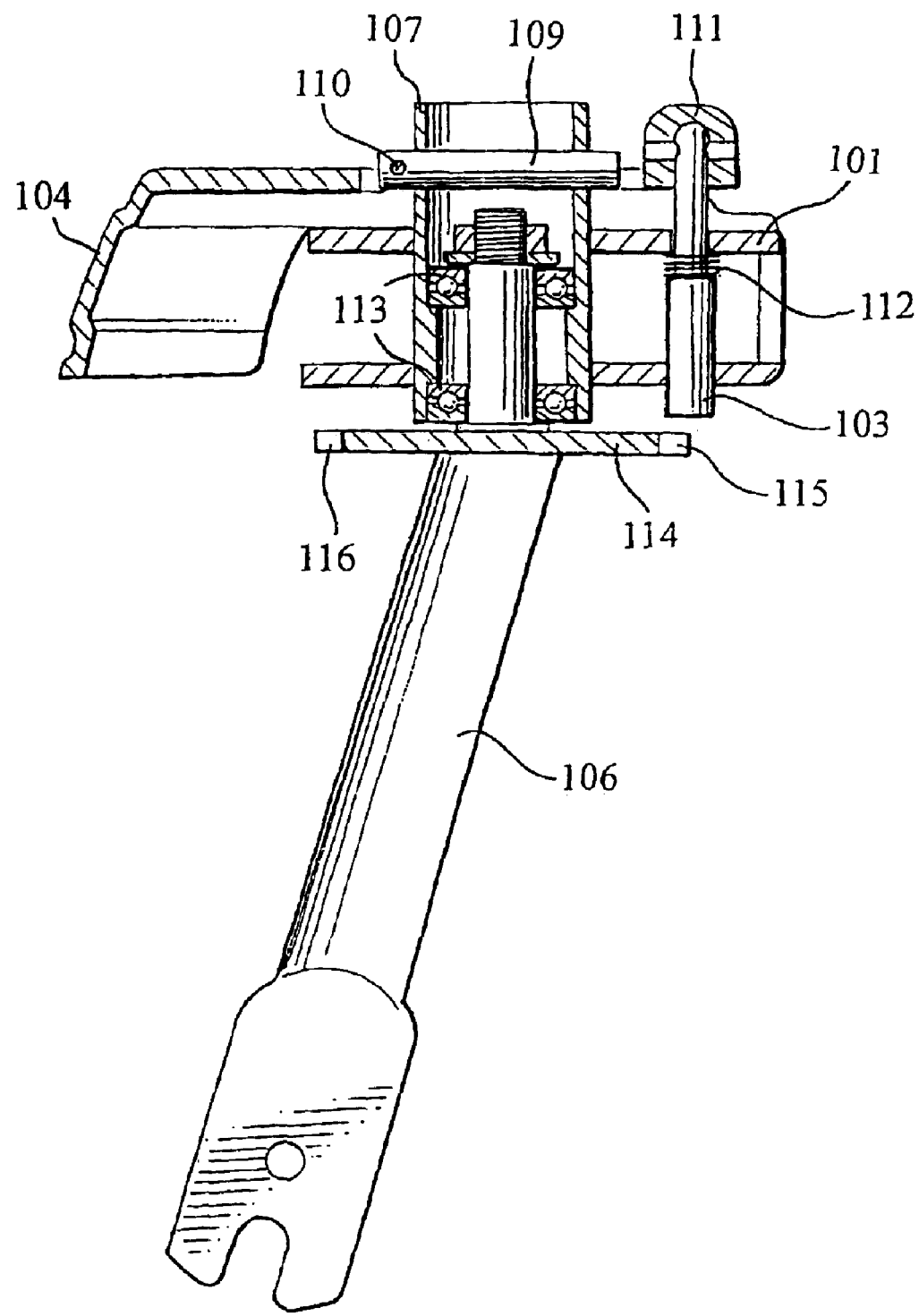
FIG. 3 is a sectional view of the wheel device for the stroller according the present invention illustrating a state under adjusting and of a forward direction.

FIG. 3 is a sectional view of the wheel device for stroller according the present invention illustrating a state under adjusting and of a forward direction. As shown in FIG. 3, when the sliding member 104 is pushed backward, the wedge member 120 of the sliding member 104 equipped at a side near the pin 103 upwardly pushes the cover 111 and lift the pin 103 to the extent that the lower end of the pin 103 is hung over the plate 114 to simultaneously make the pin 103 escape from the front opening 115 or the rear opening 116. What the FIG. 3 shows is the pin 103 escapes from the front opening 115 and the wheel 105 is in forward direction. At this time, if the sliding member 104 is pulled back to its previous position (e.g. the position departing from the supporting seat 101), the pin 103 is exerted a restoration force by the restoration element 112 and move downward to the plane of the plate 114 to engage into the front opening 115. In this state, the wheel 105 is secured and pointed to the forward direction.

Figure 4:
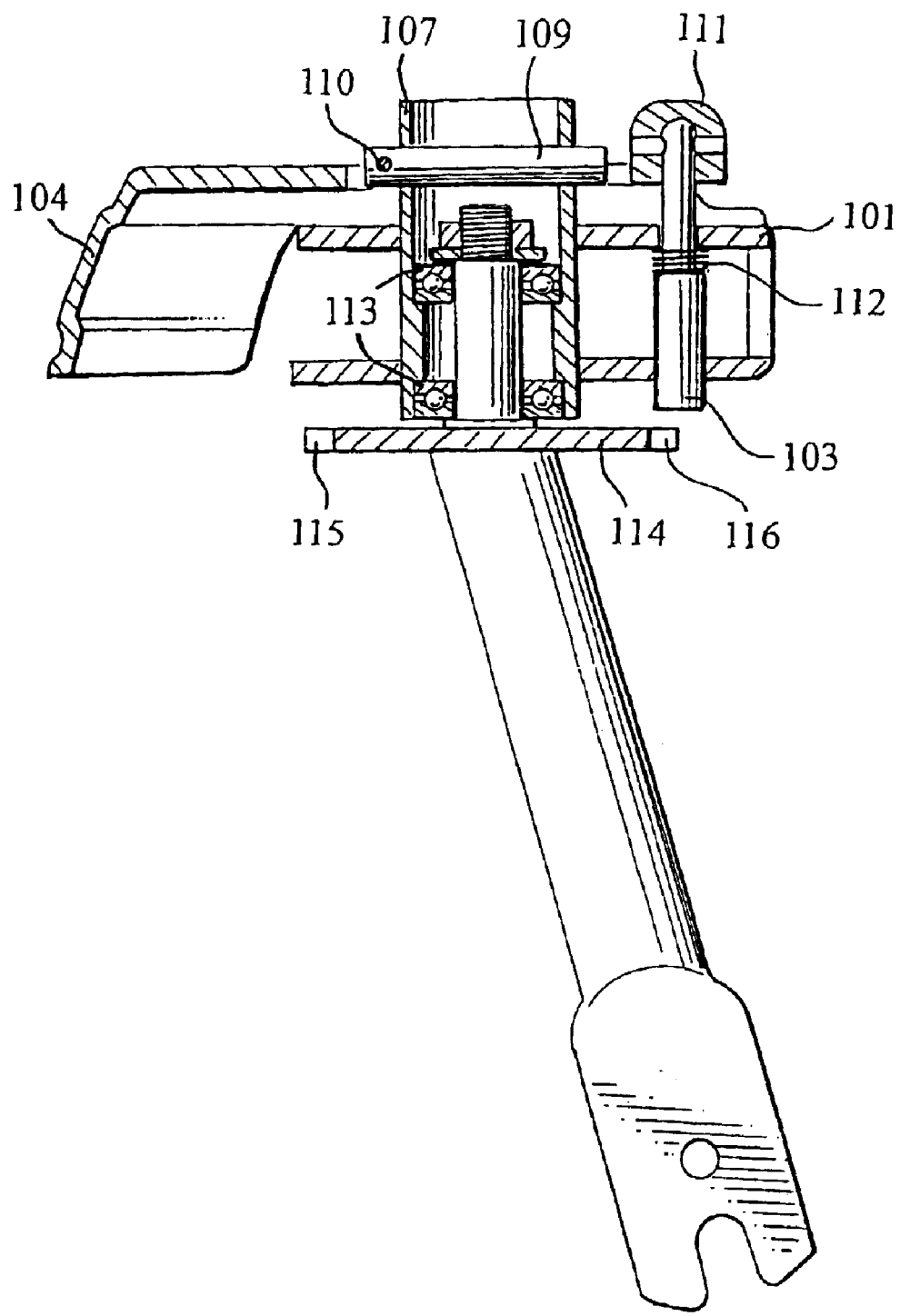
FIG. 4 is a sectional view of the wheel device for the stroller according the present invention illustrating a state under adjusting and of a backward direction.

FIG. 4 is a sectional view of the wheel device for stroller according the present invention illustrating a state under adjusting and of a backward direction. Because it is the same as what FIG. 3 shows except the backward direction, the details are not described again.

Figure 5:
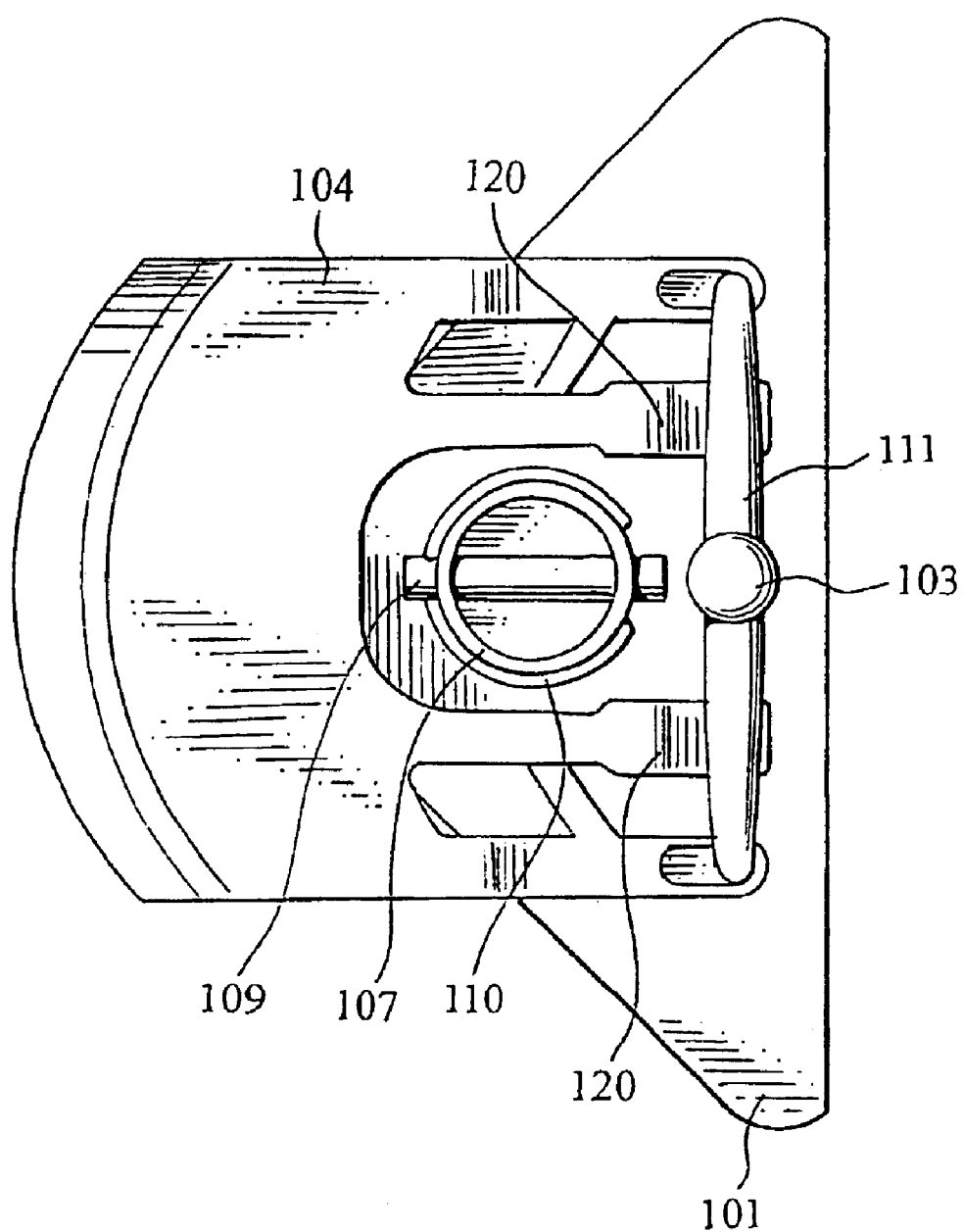
FIG. 5 is a top plane view of the wheel device for the stroller according the present invention.

FIG. 5 is a top plane view of the wheel device for stroller according the present invention. As shown in FIG. 5, the sliding member 104 slides on the upper surface of the supporting seat 101. The wedge member 120 of the sliding member 104 is interposed between the cover 111 and the supporting seat 101. When the sliding member 104 is pushed backward, e.g. toward the supporting seat 101, the wedge member 120 upwardly pushes the cover 111 and lifts the pin 103 to disengage the pin 103 with the plate 114.

This invention has been disclosed in terms of specific embodiments. It will be apparent that many modifications can be made to the disclosed structures without departing from the invention. Therefore, it is the intent of the appended claims to cover all such variations and modifications as come within the true sprit and scope of this invention.

What is claimed is:

1. A wheel device for a stroller, comprising:
   a supporting seat having a frame-receiving bore and a pin-receiving hole;
   a swivel wheel frame assembly having a plate with at least two openings and having a sleeve for penetrating the frame-receiving bore to connect the swivel wheel frame assembly with the supporting seat;
   a pin inserted in the pin-receiving hole, having a cover and a restoration element providing the pin with a restoration force; and
   a sliding member movably installed on an upper surface of the supporting seat and having a wedge member interposed between the cover and the supporting seat;
   whereby when the sliding member is situated at two different positions, the pin is correspondently in states of engagement or disengagement with the opening of the plate.

2. The wheel device for the stroller as claimed in claim 1, wherein the restoration element is a spring.

3. The wheel device for the stroller as claimed in claim 1, wherein the openings include a front opening and a rear opening.

4. The wheel device for the stroller as claimed in claim 1, wherein the swivel wheel frame assembly is provided with a stud at an upper end for securing the swivel wheel frame assembly to supporting seat.

* * * * *